United States Patent [19]

Urry

[11] 3,940,287

[45] Feb. 24, 1976

[54] PRIMARY DRY CELL WITH GAS-VENTING PASSAGEWAY AROUND THE CATHODE MIX

[75] Inventor: Lewis Frederick Urry, North Olmsted, Ohio

[73] Assignee: Union Carbide Corporation, New York, N.Y.

[22] Filed: Dec. 30, 1974

[21] Appl. No.: 537,594

[52] U.S. Cl. .................................. 136/107; 136/177
[51] Int. Cl.² .......................................... H01M 6/06
[58] Field of Search......... 136/107, 102, 100 R, 177

[56] References Cited
UNITED STATES PATENTS
3,877,992  4/1975  Urry................................... 136/107

Primary Examiner—John H. Mack
Assistant Examiner—C. F. LeFevour
Attorney, Agent, or Firm—Eugene Lieberstein

[57] ABSTRACT

Primary dry cell comprising a metal anode cup having a cathode mix therein, separated from the side wall of the anode cup by a porous, ionically permeable separator, and having an open end which is gas-tightly sealed by a closure including a vent, wherein a gas-venting passageway is provided around the cathode mix comprising a longitudinal groove in the side wall of the anode cup communicating with the void space defined between the cathode mix and the seal closure.

7 Claims, 3 Drawing Figures

PRIMARY DRY CELL WITH GAS-VENTING PASSAGEWAY AROUND THE CATHODE MIX

This invention relates to primary dry cells in general, and more particularly to certain improvements in magnesium dry cells.

Magnesium dry cells are used by the military as a power source for field radios and other similar electronic equipment. These cells have a high working voltage and they can be assembled into cell batteries having a high capacity per unit volume. However, magnesium cells are prone to generate large quantities of gas on discharge which, if not properly vented, can result in cell rupture and possible damage to the equipment. Generally, the rate of gas generation is dependent on the rate of discharge and more gas is generated at higher drains. Magnesium cells, therefore, must pass rather stringent test requirements. One of these requirements is that the cells should be capable of rapidly venting gas from inside the cells, and thus avoid cell rupture, when they are subjected to certain abusive conditions that may occur in the field, such as when the cells are inadvertently placed on a short circuit load.

The problem that is most frequently encountered in meeting this requirement is that some of the gas that is generated under abusive conditions becomes entrapped inside the cell and cannot be vented. The vent through which the gas escapes to the ambient environment is located in the seal closure at the top of the cell. Gas that is generated near the bottom of the cell owing to the anodic activity of the anode cup bottom, must pass completely through the cathode mix and into the void space located beneath the closure where the gas accumulates prior to its escape through the vent. However, some of this gas becomes trapped and the resultant gas pressure that develops pushes on the cathode mix and actually causes it to rise inside the cell like a piston, and eventually the cathode mix comes into contact with the underneath side of the closure and blocks the vent. As the gas pressure continues to rise, the cell will eventually split or the seal closure will be pushed out from the cell.

Attempts have been made to solve this problem in various ways, such as by placing mechanical restraint on the cathode mix to prevent its movement, but these attempts have not consistently given positive results, and it has become evident that some means must be devised to enable the gas to pass around the cathode mix inside the cell.

Accordingly, it is the principal object of this invention to provide such means in a primary dry cell.

With the foregoing and other objects in view, there is provided in accordance with the invention a primary dry cell, and especially a magnesium dry cell, comprising a metal anode cup having a cathode mix therein, separated from the side wall of the anode cup by a porous, ionically permeable separator, and having an open end which is gas-tightly sealed by a closure including a vent, wherein a gas-venting passageway is provided around the cathode mix comprising a longitudinal groove in the side wall of the anode cup communicating with the void space defined between the cathode mix and the seal closure. Gas that is generated near the bottom of the cell is vented through the cathode mix via the passageway into the void space from whence the gas escapes through the vent.

In the preferred embodiment of the invention, the longitudinal groove in the side wall of the anode cup, forming the gas-venting passageway, also communicates with a radial groove in the bottom wall of the anode cup.

Although the invention will be illustrated and described herein as applied to a magnesium dry cell, it is nevertheless not intended to be limited to such cell in particular, since the principles of the invention can be applied equally as well to other primary dry cell systems.

The construction and method of operation of the invention, together with additional objects and advantages thereof, will be best understood from the following description of specific embodiments when read in connection with the accompanying drawings, in which.

Figure 1:
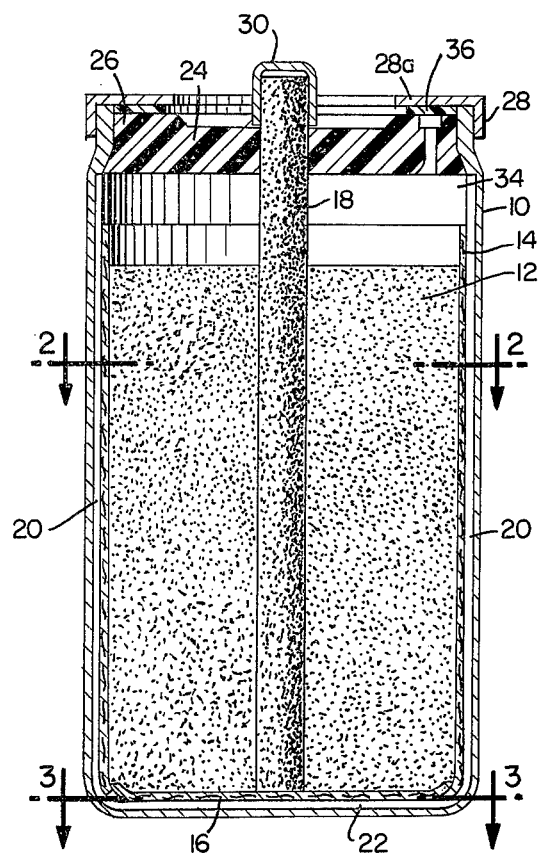
FIG. 1 is an elevational view, in section, of a magnesium dry cell constructed in accordance with the invention.
Figure 2:
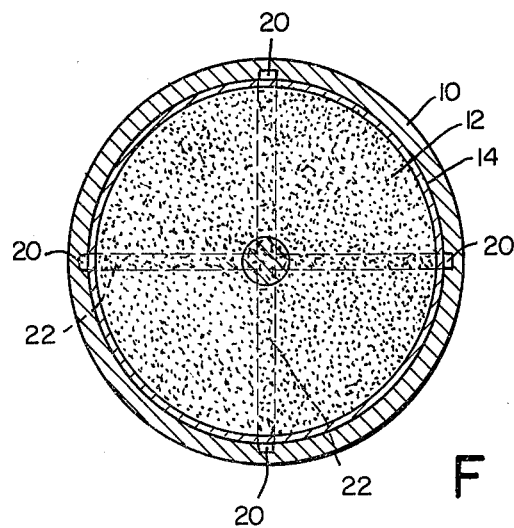
FIG. 2 is a sectional view taken along the line 2—2 in FIG. 1.

Referring now to the drawing and particularly to FIGS. 1 and 2, there is shown a primary dry cell comprising a cylindrical anode cup 10 made of magnesium metal or a magnesium alloy, and having an upper open end and a close bottom end. Within the anode cup 10 there is a cathode mix 12 comprising particles of an oxidic depolarizer, such as manganese dioxide, finely-divided conductive material, such as acetylene black, and an electrolyte. Suitably, the electrolyte may be an aqueous magnesium perchlorate solution, for example. The cathode mix 12 is separated from the side wall of the anode cup 10 by a porous, ionically permeable separator 14, suitably a porous kraft paper. The cathode mix 12 is also separated from the anode cup bottom by a porous paper or cardboard washer 16. The washer 16 is also permeable to the electrolyte and renders the anode cup bottom anodically active along with the side wall of the anode cup 10. A central carbon electrode element 18 is embedded in the cathode mix 12 and protrudes slightly beyond the upper open end of the anode cup 10.

As best illustrated in FIG. 2, four equidistantly spaced apart longitudinal grooves 20 are provided in the side wall of the anode cup 10. These longitudinal grooves 20 are located at the interface between the side wall of the anode cup 10 and the paper separator 14 and extend from just below the upper edges of the anode cup 10 to the juncture between the side and bottom walls of the anode cup 10. A pair of diametrically disposed, intersecting grooves 22 are also provided in the bottom wall of the anode cup 10 and communicate with each of the longitudinal grooves 20. Grooves 22 constitute four radial grooves each of which communicates with one of the longitudinal grooves 20.

The seal closure for the cell comprises an annular insulating disc 24 which is gas-tightly sealed within the upper open end of the anode cup 10. Disc 24 is suitably molded from a plastic material and is formed on its top surface with an annular, stepped or raised portion 26 surrounding its outer periphery. The disc 24 is fitted tightly around the protruding end portion of the carbon electrode element 18 and its outer edges abut against the interior side wall of the anode cup 10. The upper side wall of anode cup 10 is turned or bent inwardly by a seal ring 28, suitably made of steel. This ring 28 is compressed or forced inwardly under a high radial pressure against the side wall of the anode cup 10 to form a tight radial seal between the abutting outer edges of the disc 24 and the interior side wall of the anode cup 10. A metal terminal cap 30 is fitted over the top of the carbon electrode element 18 and serves as the positive terminal of the cell.

A resealable vent is incorporated in the seal closure and is preferably constituted by a small vent aperture 32 which is provided in the insulating disc 24. The vent aperture 32 communicates with the void space 34 which is defined between the disc 24 and the exposed surface on the cathode mix 12. The cathode mix 12 substantially fills the anode cup 10 to just below its upper peripheral edges leaving enough space for the insulating disc 24 and the void space 34. Overlying the vent aperture 32 is a flat annular seal gasket 36. This gasket 36 may be made from any suitable elastomeric material, such as Tenite (cellulose acetate or cellulose acetate butyrate), and preferably covers the whole top surface of the annular stepped or raised portion 26 on the disc 24. The seal ring 28 has one leg element 28a which extends radially inwardly from the peripheral edge of the anode cup 10 and is mounted in resilient pressure contact against the top of the flat annular seal gasket 36. The leg element 28a constitutes a retaining member which biases the seal gasket 36 into normally sealing relation around the vent aperture 32. Upon the build-up of a predetermined excessive gas pressure in the void space 34, the leg element 28a deflects slightly in a direction away from the gasket 36 and allows gas to escape through the vent aperture 32. Once the gas pressure has been relieved, the resiliency of the leg element 28a causes it to again close or seal the aperture 32. A more detailed discussion of the resealable vent and its method of operation is given in U.S. Pat. No. 3,494,801 to L. F. Urry.

Figure 3:
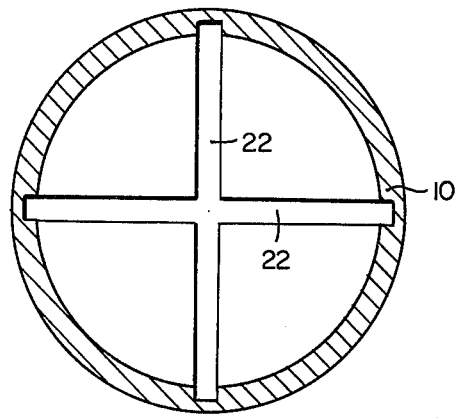
FIG. 3 is a view similar to FIG. 2, taken along the line 3—3 in FIG. 1.

In the embodiment of the invention illustrated in FIGS. 1–3, the four longitudinal grooves 20 communicate with the void space 34 and thus enable any gas that is normally trapped near the bottom of the anode cup 10 to pass via the diametrically disposed grooves 22 into the void space 34 from whence the gas can readily escape through the vent.

It should be understood that any number of longitudinal grooves 20 may be employed in the side wall of the anode cup 10. Generally, the gas-venting passageway provided by one longitudinal groove 20 alone (i.e., without a radial groove in the anode cup bottom) will suffice for the purpose of venting gas normally trapped at the bottom of the cell.

Thus it will be seen that the invention provides a means in a primary dry cell for venting gas around the cathode mix which might otherwise become trapped near the bottom of the anode cup causing the cathode mix to rise like a piston into contact with the seal closure and block the vent. It will of course be apparent that the advantages made possible by the invention cannot be fully realized unless the vent that is used in the seal closure is capable of venting the gas at a high rate from inside the cell. Various types of high rate vents can of course be used. So-called "plug vents" can be employed, for example, which are capable of venting gas at high rates, although these vents are not resealable. Such vents consist of a vent opening in the closure disc which is sealed by a plug of wax or other low melting point sealant. The plug is expelled from the vent upon the development of high internal gas pressure or temperature or both. A vent of this type which has proven particularly advantageous for use in magnesium cells and which is recommended for use in primary dry cells of the invention is disclosed and claimed in the co-pending application of L. F. Urry, Ser. No. 384,446, filed on Aug. 1, 1973.

What is claimed is:

1. A primary dry cell comprising a metal anode cup having an open end which is gas-tightly sealed by a closure including a vent and having a cathode mix therein comprising particles of an oxidic depolarizer, finely-divided conductive material and an electrolyte, separated from the side wall of said anode cup by a porous, ionically permeable separator, said closure and said cathode mix defining a void space therebetween, wherein a gas-venting longitudinal groove in the side wall of said anode cup communicating with said void space to thereby enable gas normally entrapped near the bottom of said anode cup to pass freely around said cathode mix and into said void space from whence the gas can escape through said vent.

2. The primary dry cell as defined in claim 1, wherein said gas-venting passageway further includes a radial groove, communicating with said longitudinal groove, in the bottom wall of said anode cup.

3. The primary dry cell as defined by claim 2, wherein a multiplicity of said longitudinal and radial grooves are substantially equidistantly spaced apart in the side and bottom walls of said anode cup.

4. The primary dry cell as defined by claim 3, wherein four longitudinal and radial grooves are provided 90° apart in the side and bottom walls of said anode cup.

5. The primary dry cell as defined in claim 1, wherein a central carbon electrode element is embedded in said cathode mix and protrudes slightly beyond the open end of said anode cup and wherein said closure comprises an annular insulating disc gas-tightly fitting around said carbon electrode element and within said open end of said anode cup.

6. The primary dry cell as defined by claim 5, wherein said vent comprises a vent aperture in said annular insulating disc, a seal gasket overlying said vent aperture and a seal ring surrounding the peripheral edges of said anode cup and having a leg element extending inwardly and biasing said seal gasket into sealing relation around said vent aperture, said leg element being deflectable in a direction away from said seal gasket upon the build-up of a predetermined high internal gas pressure inside said cell.

7. The primary dry cell as defined in claim 5, wherein said vent comprises a vent opening in said annular insulating disc which is closed by a seal plug made of a low melting point sealant and which is expelled from said vent opening upon the build-up of a predetermined high internal gas pressure or temperature inside said cell.

* * * * *